Aug. 12, 1941.   O. A. BANNER   2,251,972
HYDRAULIC TRANSMISSION
Filed March 21, 1938   4 Sheets-Sheet 2

OTTO A. BANNER
INVENTOR
BY
ATTORNEY

OTTO A. BANNER
INVENTOR
BY [signature]
ATTORNEY

Patented Aug. 12, 1941

2,251,972

UNITED STATES PATENT OFFICE 2,251,972

HYDRAULIC TRANSMISSION

Otto A. Banner, Highland Park, N. J.

Application March 21, 1938, Serial No. 197,291

2 Claims. (Cl. 60—54)

This invention relates to hydraulic transmissions and more particularly to hydraulic transmissions of the shiftable guide vane system type wherein the forward, reverse and stop operations of the turbine or power take-off vane system of the transmission is controlled by the shifting of suitable guide vanes.

An object of the present invention is to provide in a hydraulic transmission as specified, means for shifting the shiftable guide vane system by pressure fluid operated means, shiftable along the axis of rotation of the vane systems, whereby axial fixation of the guide vane system in any desired position may be had to provide speed variation of the power take-off of the transmission.

Another object of the invention is to provide a brake structure cooperating with said shiftable guide vane system for holding the guide vane system against rotation in any position of axial fixation.

The present application embodies subject matter divided out from, and is a continuation in part of, my co-pending application on Hydraulic transmission, filed April 28, 1933, Serial Number 668,351, now Patent No. 2,162,543.

With these and other objects in view, as may appear from the accompanying specification, the invention consists of various features of construction and combination of parts, which will be first described in connection with the accompanying drawings, showing a hydraulic transmission embodying the invention, and the features forming the invention will be specifically pointed out in the claims.

Figure 1:
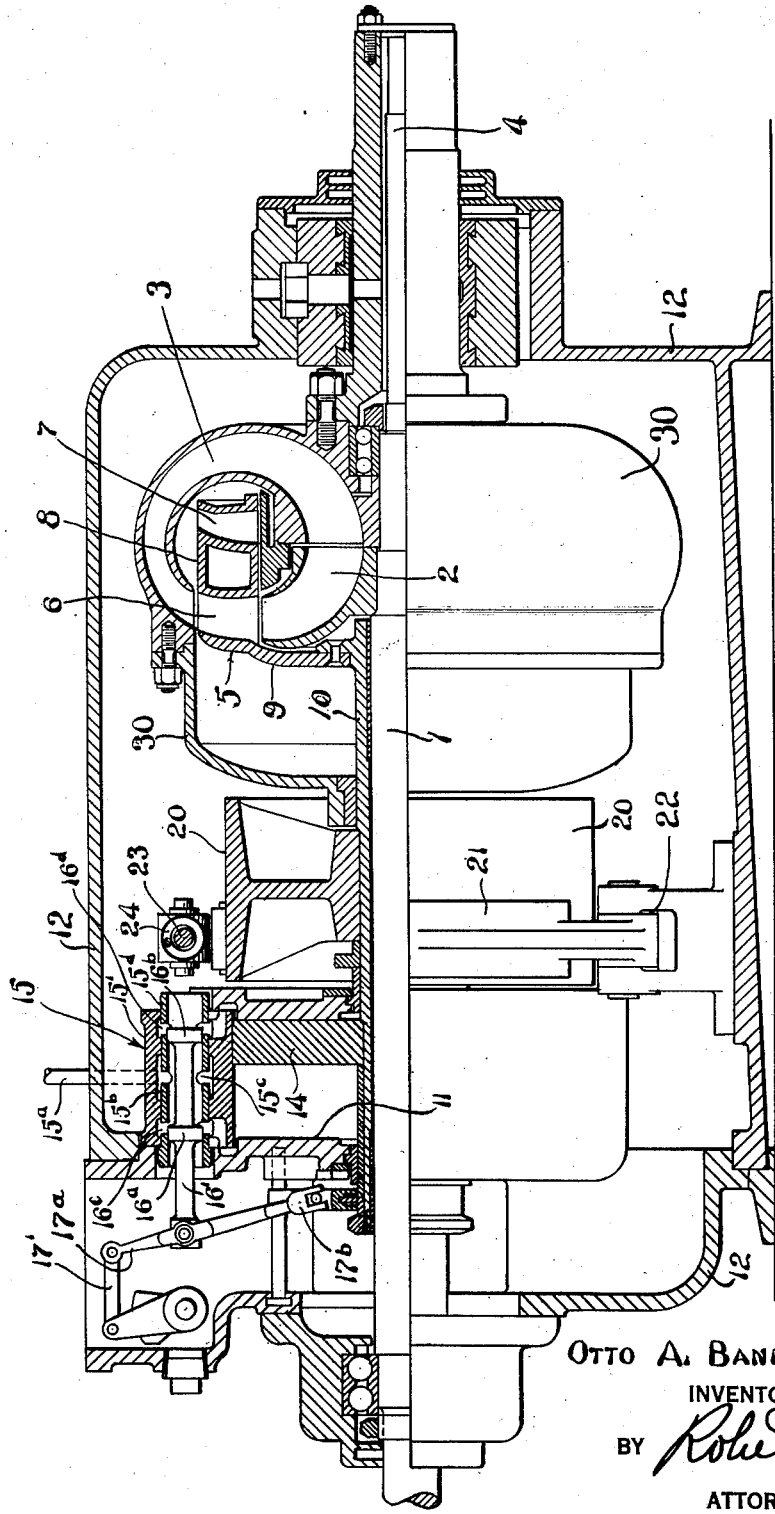
Figure 1 is a view partly in longitudinal section and partly in side elevation of the improved hydraulic transmission.

Referring more particularly to the drawings, the improved hydraulic transmission includes a primary shaft 1 which carries the primary or pumping vane system 2. The primary or pumping vane system 2 imparts pressure and velocity to the operating fluid of the transmission which serves to drive the turbine or power take-off vane system 3. The turbine or power take-off vane system 3 is carried by the secondary or power take-off shaft 4. The forward, or ahead, reverse and stop operations of the turbine vane system 3 are controlled by various adjustments of the shiftable vane system 5.

The shiftable vane system 5 is of approved construction such as that shown in my pending application Serial Number 668,351 and comprises an ahead vane system 6, a reverse vane system 7 and a blank ring 8 to cut off communication between the primary or pumping impeller vane system 2 and the secondary or turbine vane system 3.

The ahead and reverse vane systems 6 and 7 and the blank ring 8 are carried by a web 9 which is in turn attached to a sleeve 10. The sleeve 10 is slidably mounted on the primary shaft 1 for longitudinal adjustment therealong, that is, adjustment along the axis of rotation of the vane systems of the hydraulic transmission.

The sleeve 10 projects into a cylinder 11 which is carried by the casing 12 of the transmission. A piston 14 is mounted on the sleeve 10 and is rigidly connected to the sleeve in any suitable manner so that movement of the piston 14 within the cylinder 11 will shift the shiftable guide vane system 5. Operating pressure fluid from any suitable source (not shown) is admitted to the cylinder 11 under control of a valve structure 15.

The valve structure 15 comprises a cylinder 15′ to which the pressure fluid is delivered through a suitable pipe 15ª. The pressure fluid enters the annular space 15ᵇ from the supply pipe 15ª passes through ports 15ᶜ into the interior of the valve sleeve 15ᵈ. A piston valve 16′ is mounted for reciprocatory movement in the valve sleeve 15ᵈ and has heads 16ª and 16ᵇ thereon which control the ports 16ᶜ and 16ᵈ. The ports 16ᶜ and 16ᵈ open into opposite ends of the cylinder 11 and when the valve piston 16′ is shifted for delivering operating pressure fluid into one end of the cylinder 11 the opposite end of the cylinder is opened out to exhaust crossing through the open end of the valve sleeve 15ᵈ. Any suitable mechanism such as that shown at 17′ may be employed for operating the valve structure. The operating mechanism 17′ is connected to the valve piston 16′ by a floating lever 17a. The floating lever 17a is connected intermediate its ends to the piston valve 16′ and at its end remote from the operating mechanism 17′ to the sleeve 10 by a fork and pin connection 17b.

By regulating the operation of the valve 15 the shiftable guide vane system 5 may be held in any desired axial position to permit control of the speed of operation of the turbine vane system 3 or in other words to provide speed variation of the power take-off of the transmission.

Figure 3:
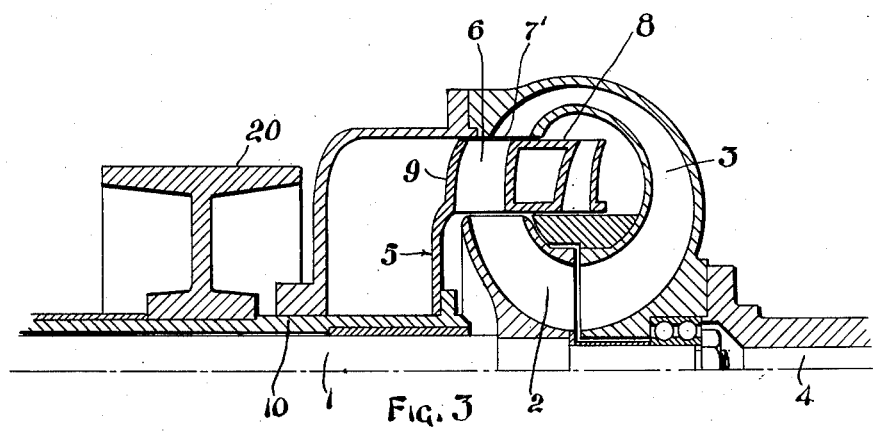
Figures 3, 4 and 5 are fragmentary longitudinal sections through the transmission showing the shiftable guide vane system in various adjusted positions.
Figure 4:
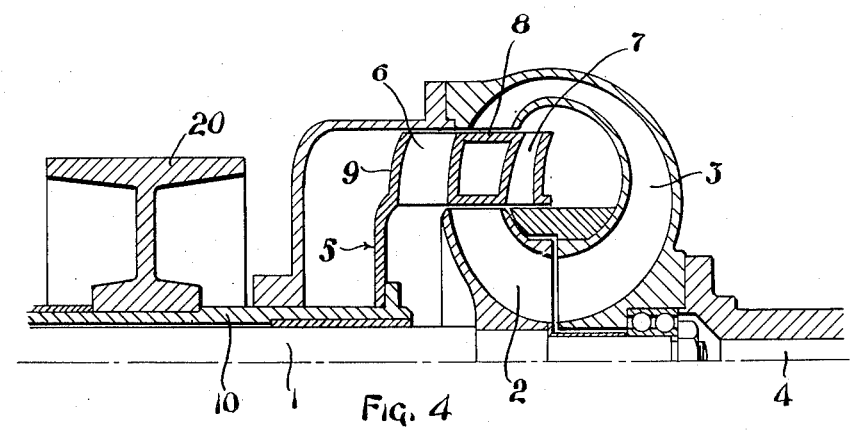
Figure 5:
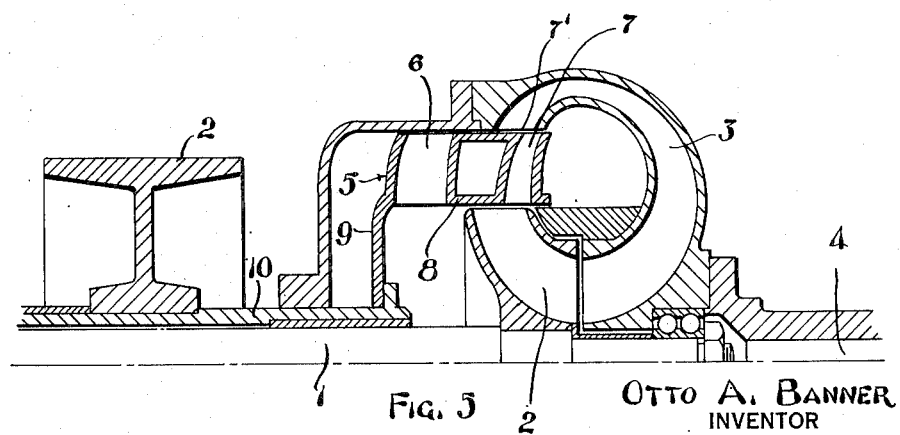

Figures 3 to 5 inclusive show various adjustments of the shiftable vane system 5, for instance in Figure 3 of the drawings, the shiftable vane system 5 is in position to provide substantially one-half speed ahead, that is, it is shifted into position so that substantially one-half of the entrance 7' into the turbine vane system 3 is cut off from the exit of the pumping impeller 2 by the blank ring 8.

In Figure 4 of the drawings the shiftable guide vane system 5 is shifted into position with the blank ring 8 completely cutting off communication between the pumping impeller 2 and the turbine impeller 3, while in Figure 5 the guide vane system is shifted to provide reverse operation at substantially one-half speed. This operation is provided by the blanking off of substantially one-half of the entrance 7' by the blank ring 8. It will be readily understood that by variation of the degree of adjustment of the shiftable guide vane ring system 5 any desired degree of speed of operation of the turbine impeller 3 between the maximum and minimum speeds may be provided.

The sleeve 10 has a brake drum 20 mounted thereon for rotation with the sleeve, and a plurality of brake shoes 21 are provided for cooperation with the brake drum 20 to stop rotation of the sleeve 10 and of the guide vane system 5 in any position of adjustment of the guide vane system permitted within the limits of movement of the guide vane system.

Figure 2:
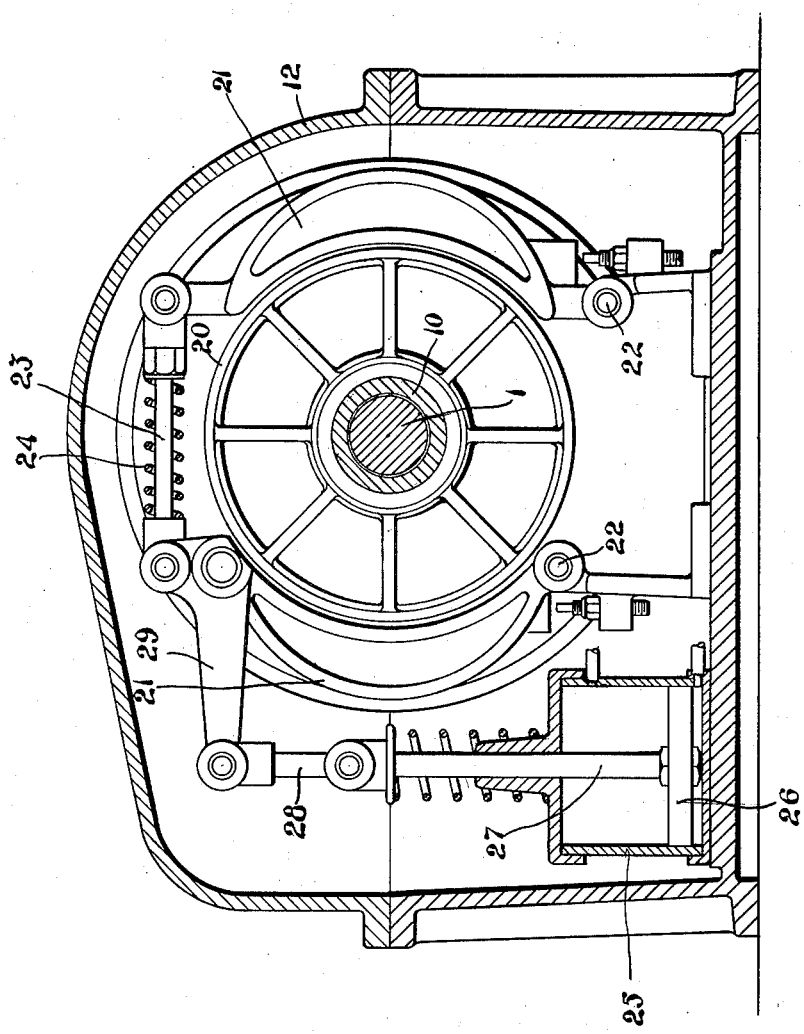
Figure 2 is a vertical cross section through the transmission.

The brake shoes 21 are pivotally mounted as shown at 22 and their free ends are connected by a suitable connecting rod 23 about which is positioned a spring 24. The spring 24 is tensioned to urge the brake shoes 21 away from the brake drum 20 or out of braking position. In Figure 2 of the drawings pressure operated means is illustrated for operating the brake shoes 21. The pressure operated means comprises a cylinder 25 in which is mounted a piston 26. The piston 26 is connected by a piston rod 27 and an articulate connection 28 with the brake shoe operating arm 29. Operating pressure fluid for operating the piston 26 may be derived from any suitable source (not shown), preferably from the same source as the pressure fluid which is employed for operating the piston 14, and admission to and exhaust from the cylinder 25 of the operating pressure fluid may be controlled by any approved type of valve (not shown).

In the form of the invention shown in Figures 1 to 5 inclusive, the casing 30 of the turbine or secondary vane system or wheel 3 envelops the primary or pumping vane system 2 and the shiftable guide vane system 5. The movement, adjustment and holding of the guide vane system 5 is effected by the sleeve 10 which extends to the outside of the secondary casing 30. This construction makes it possible to hold the guide vane ring 5 stationary while the casing 30 surrounding it is rotating.

Figure 6:
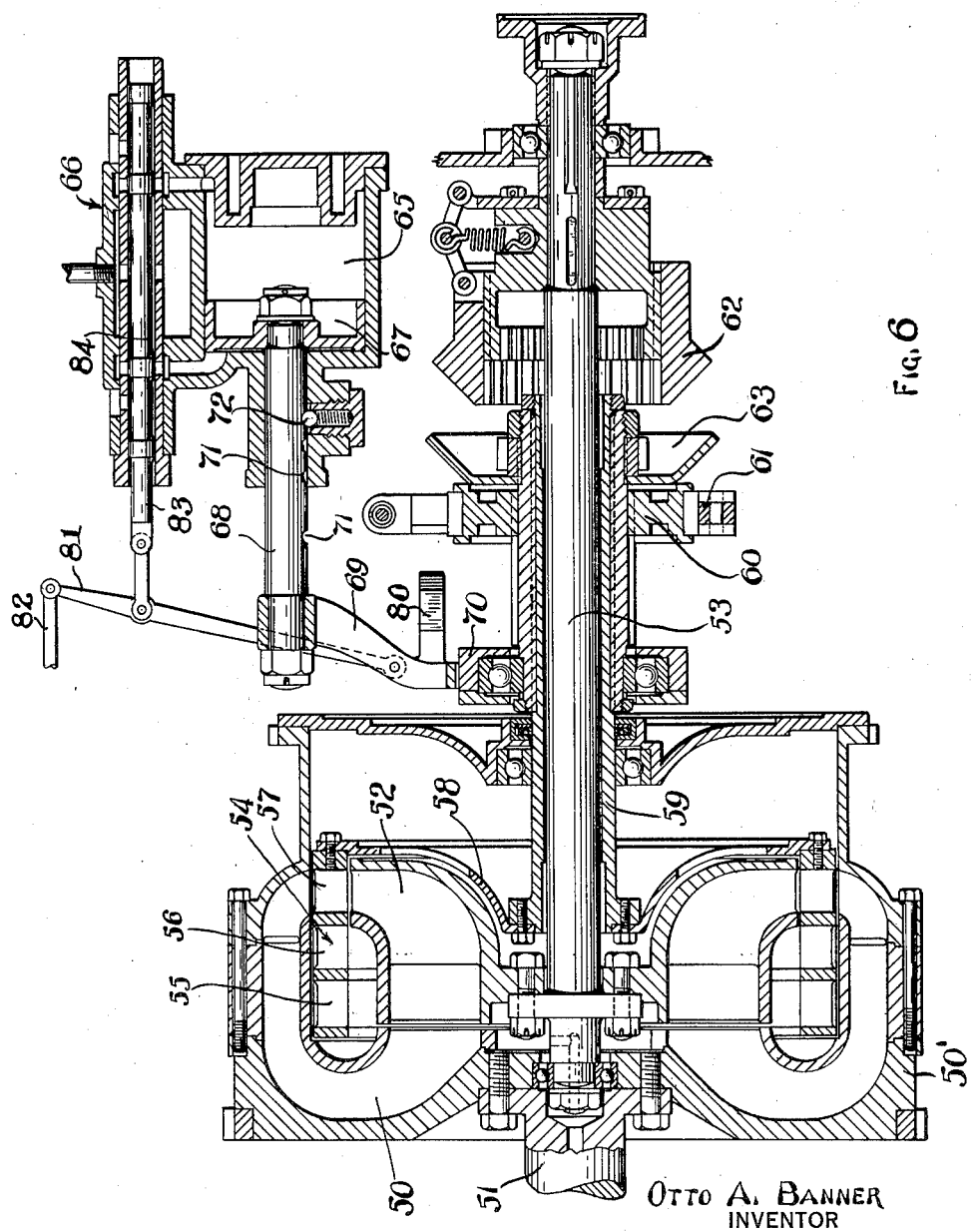
Figure 6 is a longitudinal section through a modified form of hydraulic transmission embodying my invention.

In Figure 6 of the drawings a modified form of the present invention is shown and this modified form is the same structure as that shown in Figure 26 of my co-pending application filed April 28, 1933, Serial Number 668,351.

The modified form of transmission includes the primary wheel or pumping vane system 50 which is mounted on the primary shaft 51, the secondary or turbine wheel 52 mounted upon and connected to the secondary or power take-off shaft 53, and the shiftable vane ring structure 54.

In all general principles of construction and operation the vane ring structure 54 is similar to the shiftable vane ring structure 5 comprising three rings 55, 56 and 57, each having a set of fixed guide vanes therein. The three guide vane rings 55, 56 and 57 are mounted upon a disc 58 which in turn is fixedly connected with a sleeve 59. The sleeve 59 surrounds the secondary or power take-off shaft 53 and is slidable thereon. The guide vanes in the ring 55 are for clutch operation, the vanes in the ring 56 are for slow ahead operation, while the ring 57 is for reverse operation. The vanes in all three of these rings may be cast in one piece with the rings. Each of the rings may be moved between the primary wheel 50 and the secondary wheel 52 by the axial shifting of the sleeve 59.

A brake drum 60 and co-operating brake shoes 61 are associated with the sleeve 59 so that during transformer operation the brake drum is held against rotation by the brake shoes, and during clutch operation the brake shoes are operated to release the brake drum 60 for operation and the coupler section 62 is moved into mesh with the coupler section 63.

The sleeve 59 is shifted to shift the adjustable guide vane ring structure 54 by a pressure operated mechanism and as shown in this Figure 6 of the drawings the pressure operated shifting mechanism comprises a cyclinder 65 to which pressure operating fluid from any suitable source is delivered. The delivery of the operating pressure fluid to the cylinder 65 is controlled by a valve mechanism 66 which is substantially of the same construction as the valve mechanism 15 and operates like it. The follow-up device of this modified form is similar to and acts the same as the follow-up device shown in Figure 1 of the drawings. This follow-up device includes a floating lever 81 connected to the arm 69 at one end and to an operating rod 82 at the other end.

The floating lever 81 is connected intermediate its ends to the piston rod 83 of the piston valve 84 of the control mechanism 66. The arm 69 has a brake release forming member 80 formed thereon. A piston 67 is reciprocated in the cylinder 65 by the operating pressure fluid, its direction of movement being controlled by the valve structure 66.

A piston rod 68 is connected to the piston 67 and by a suitable arm 69 to a connecting structure 70. The connecting structure 70 is in turn connected to the sleeve 59 in such manner that the sleeve is free to rotate but will be moved longitudinally by movement of the member 70 and consequently by movement of the piston 67. The piston rod 68 is shown as having a plurality of notches 71 therein with which a spring pressed latch 72 cooperates for momentarily holding the piston 67 in any one of a plurality of predetermined positions.

The sleeve 59, being mounted about the secondary shaft 53, provides axial means for shifting the guide vane rings.

While in the form of the invention shown in Figures 1 to 5 inclusive, the casing 30 of the turbine or secondary wheel envelopes the primary or pumping wheel 2, in the form shown in this Figure 6 of the drawings, the casing 50' of the primary or pumping wheel 50 envelopes the secondary or turbine wheel 52. However, the guide vane sleeve 59 extends outside of the casing 50' so that it may be held stationary even though the casing 50' is rotating.

It will be understood that the invention is not to be limited to the specific construction of arrangement of parts shown but that they may be widely modified within the invention defined by the claims.

What is claimed is:

1. In a hydraulic transmission including a primary wheel, a vaned secondary wheel, and a shiftable rotatable guide vane system, shiftable to provide forward and reverse drive of the secondary wheel, a primary shaft for said transmission, a shiftable sleeve on said primary shaft and connected to said guide vane system, a piston on said sleeve, a cylinder enclosing said piston, means for controlling the delivery of pressure fluid to said cylinder to shift the piston for shifting said guide vane system, and brake means associated with said guide vane system for holding it against rotation.

2. In a hydraulic transmission including a primary impeller, a secondary impeller driven by fluid from said primary impeller, and a shiftable rotatable guide vane system between said primary and secondary impellers, said shiftable guide vane system including an ahead vane system, a reverse vane system, and a blank ring for cutting off fluid flow between said primary and secondary impellers, a primary shaft for said transmission, a shiftable sleeve on said primary shaft and connected to said guide vane system, a piston on said sleeve, a cylinder enclosing said piston, and means for controlling the delivery of pressure fluid to said cylinder to shift the piston for shifting said guide vane system.

OTTO A. BANNER.